United States Patent
Klecka et al.

(10) Patent No.: US 6,393,582 B1
(45) Date of Patent: May 21, 2002

(54) ERROR SELF-CHECKING AND RECOVERY USING LOCK-STEP PROCESSOR PAIR ARCHITECTURE

(75) Inventors: James Stevens Klecka, Lexington; William F. Bruckert, Austin, both of TX (US); Robert L. Jardine, Cupertino, CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/209,635

(22) Filed: Dec. 10, 1998

(51) Int. Cl.[7] .................................................. G06F 11/34
(52) U.S. Cl. ............................. 714/11; 714/23; 714/10
(58) Field of Search ........................ 714/43, 11, 12, 714/10, 3, 2, 1, 15, 23

(56) References Cited

U.S. PATENT DOCUMENTS

| | | | |
|---|---|---|---|
| 4,096,990 A | * 6/1978 | Strelow | ........................ 714/11 |
| 4,176,258 A | 11/1979 | Jackson | |
| 4,541,094 A | 9/1985 | Stiffler et al. | |
| 4,723,245 A | 2/1988 | Leslie | |
| 4,843,608 A | 6/1989 | Fu et al. | |
| 5,065,312 A | * 11/1991 | Bruckert et al. | ............... 714/11 |
| 5,689,632 A | * 11/1997 | Galy et al. | ..................... 714/11 |
| 5,748,873 A | * 5/1998 | Ohguro et al. | ................ 714/11 |
| 5,838,894 A | * 11/1998 | Horst | .......................... 714/11 |
| 5,953,742 A | * 9/1999 | Williams | ..................... 714/11 |
| 6,233,702 B1 | * 5/2001 | Horst et al. | .................... 714/11 |

* cited by examiner

*Primary Examiner*—Paul R. Myers
(74) *Attorney, Agent, or Firm*—Leah Sherry; Oppenheimer Wolff & Donnelly

(57) ABSTRACT

A logical processor is formed from a pair of processor units operating in close synchrony to perform self-check operations. Outputs of one of the processor units are compared to that of the other processor unit. When one of the processor units experiences an error, creating a divergence, that error and/or divergence will be made known to the Master processor which will then determine if recovery from the error can be made and, if so, save its processing state to memory, cause a reset of both processor units to an initial state to begin executing reinitialization code using the prior saved state for both processor units.

13 Claims, 3 Drawing Sheets

ERROR SELF-CHECKING AND RECOVERY USING LOCK-STEP PROCESSOR PAIR ARCHITECTURE

BACKGROUND OF THE INVENTION

The present invention relates generally to fault-tolerant data processing architecture, and more particularly to a logical processor formed from at least two processor units operating to execute identical instruction streams, executing those instruction streams in close synchrony.

Among the important aspects of fault-tolerant architecture are (1) the ability to tolerate a failure of a component and continue operating, and (2) to maintain data integrity in the face of a fault or failure. The first aspect often sees employment of redundant circuit paths in a system so that a failure of one path does not halt operation of the system. Another approach, which may be applicable to the second aspect of fault-tolerant architecture, is to use self-checking circuitry (one example of which is the "duplicate and compare" technique). The self-checking approach involves using substantially identical modules (e.g., processor units) that receive the same inputs to produce the same outputs, and those outputs are compared. If the comparison sees a mismatch, both modules are halted in order to prevent a spread of possible corrupt data. Examples of self-checking may be found in U.S. Pat. Nos. 4,176,258, 4,723,245, 4,541,094, and 4,843,608.

One problem with the self-checking approach, when used for fault-tolerant processor design using paired processors in a duplicate and compare configuration, is that certain so-called "soft" errors (e.g., a cache error seen by one of the paired processors but not the other) require both processors to be halted and restarted. Thus, the detection of the fault, and recovery from that fault, is not necessarily transparent to the user, and even if transparent, the recovery process (typically involving a halt and reboot operation) can take a relatively long time. This problem is exacerbated by the recent use of larger and larger cache memory, both internal and external. But cache errors are only one type of error that can be experienced by processors from which recovery may be attempted. Processor designs using translation look-a-side buffers with entry checking, parity checking, bus protocol checking, and the like can have one processor seeing an error while the other does not when using the duplicate and compare technique.

Thus, a technique for recovering smoothly and quickly from self-checking divergence of pairs of self-checking processor modules as a result of errors detected by one and not the other is needed.

SUMMARY OF THE INVENTION

According to the present invention, a logical processor is formed from a pair of processor units and a single memory. Both processor units execute identical instruction streams, instruction by instruction, in close synchrony. However, only the output of one of the processor units (the "Master" processor unit) is used; the output of the other processor unit (the "Shadow" processor unit) is compared to that of the Master processor unit for self checking. If a divergence is detected, the Master processor unit determines the cause of the divergence. If the Master processor unit determines that the divergence resulted from an error from which recovery is possible, it will save its present processor state to memory, cause a reset operation to be initiated to reset both the Master and Shadow processor units and reinitialize them, using the prior saved state. Thereby, both processor units quickly and smoothly recover from the detected error to resume operation from about the point at which the error was encountered.

In a further embodiment of the invention, when divergence between the two processor units is detected, output data transmission from the logical processor is immediately, but temporarily, suspended in order to prevent the spread of but possibly corrupt data through the larger system that may be incorporating the logical processor. When the Master processor determines that recovery is possible, data transmission is resumed.

In a still further embodiment of the invention, a timer is periodically preset with a predetermined value and allowed to count down (or up). If the timer is allowed to time out (i.e., reach another predetermined value) before being preset again, the logical processor will be subjected to a hard reset and reboot operation. This feature operates to preclude the logical processor from entering a loop of error detection and recovery (or any other loop) from which it cannot escape.

A number of advantages flow from the present invention. The reset and reinitialization process in the face of a divergence, i.e., saving state to memory, resetting the processor units, and restarting them from the prior saved processor state, is much quicker than the prior use of halting the processors and reloading them where processor state (and processes therein) are lost, backup takeovers happen, and persistent processes are restarted. The present invention provides a substantially transparent recovery from many of the "soft" failures that can be encountered by self-checking processors.

Additionally, the present invention may be implemented using commercially-available microprocessors as long as the source of an error can be determined to be due to one microprocessor or the other.

These and other aspects and advantages of the invention will become apparent to those skilled in the art upon reading of the following detailed description of the invention, which should be taken in conjunction with the accompanying drawings.

DESCRIPTION OF THE PREFERRED EMBODIMENT

Figure 1:
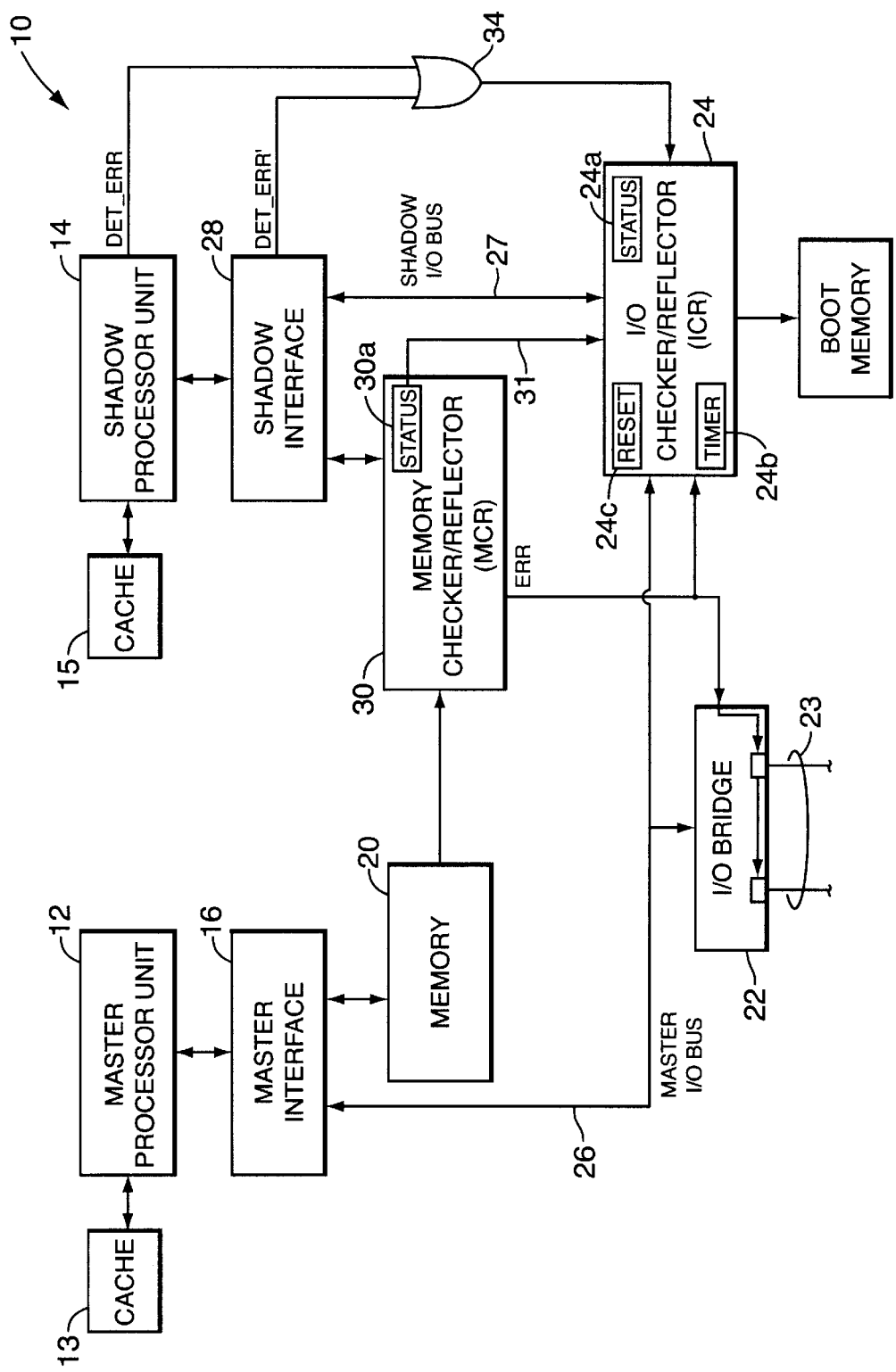
FIG. 1 is a simplified block diagram of the logical processor of the present invention formed from two interconnected processor units.

Referring now to the figures, and specifically for the moment FIG. 1, there is illustrated a logical processor designated generally with the reference numeral 10. It should be understood that the logical processor 10 usually forms a part of a larger data processing system that is not shown in order to refrain from unduly complicating the figure. As FIG. 1 shows, the logical processor 10 includes a Master processor unit 12 and a Shadow processor unit 14, both of which also include various cache memory structures that may be internal or external, or both to the processor or microprocessor forming the processor unit. Such cache memory structures are represented generally as the cache 13, 15.

The Master processor unit 12 is coupled, via a Master interface 16, to a memory 20, and to an I/O bridge 22 and I/O checker/reflector (ICR) 24 by the Master interface 16 and a Master I/O bus 26. The I/O bridge 22 connects the logical processor 10 to I/O links 23, providing the input/output gateway between the logical processor 10 and the remainder of the data processing system (not shown). The I/O bridge 22 is merely representative of the various ways the logical processor 10 can be communicated to a larger system. For example, the I/O bridge 22 (and associated I/O links 23) could be a pair of interface elements: one for interprocessor communication in a multiple processor system, and another for input/output communication between the logical processor 10 and various peripheral units—such as taught in U.S. Pat. No. 4,228,496. Alternatively, the I/O bridge 22 and I/O links 23 could be a single interface to a communication network that provides a means of communication between the logical processor 10 and other processor units in a multiple processing environment as well as communication with peripheral devices such as illustrated in U.S. Pat. No. 5,751,932. Those skilled in this art will recognize that other communication interface structures could also be used to implement the I/O bridge 22 and I/O links 23.

The Shadow processor unit 14 similarly connects to a Shadow interface 28 which, in turn, couples the Shadow processor unit 14 to a memory checker/reflector (MCR) 30 and to the I/O checker/reflector 24. In addition, the Shadow processor 14 has an output that communicates Detected Error (Det_ERR) signal to an OR gate 34. A second input to the OR gate 34 receives a DET_ERR' signal from the Shadow interface 28. The output of the OR gate 34 is applied to the I/O checker/reflector 24. The DET_ERR signal is asserted by the Shadow processor unit 14 when self-checking detects a correctable error (e.g., a single-bit error in an ECC-checked (single-error correcting) cache or translation table) or an incorrectable error (e.g., a single-bit error in a parity-checked (single-error detecting) cache or translation table). The Shadow interface 28 will assert the DET_ERR' signal when it detects similar types of errors.

The ICR 24 and MCR 30 operate to respectively emulate the I/O bridge 22 and the memory 20 to the Shadow processor unit 14. Incoming I/O data is coupled from the I/O bridge 22 to the Master interface unit 16 which then couples that I/O data to the Master processor unit 12 (e.g., for cache updates, etc.) and to the memory 20 for storage. That incoming I/O data is also coupled to the Shadow interface unit 28 which, in turn, communicates that incoming I/O data to the Shadow processor unit 14 (also for cache updates and the like). Outgoing I/O data from the Master interface 12 is transmitted, via the Master interface 16 and Master I/O bus 26, onto the I/O links 23 by the I/O bridge 22. The Shadow processor unit 14 will also write the same outgoing I/O data (if operating correctly). The Shadow output I/O data is conveyed by the Shadow interface 28 to the ICR 24 where it is checked against the outgoing I/O data produced by the Master processor unit 12.

Similarly, when the Master processor unit 12 requests a memory read operation (via the interface unit 16) the data from the memory 20 that is coupled to the Master interface unit 16 in response is also coupled to the MCR 30 and "reflected" to the Shadow interface 28 in response to the identical request (albeit, perhaps a clock or two later).

Both the Master processor unit 12 and the Shadow processor unit 14 perform write operations. However, it is only the Master processor unit 12 that is actually writing data to memory; the data "written" by the Shadow processor unit 14 (together with the address and control signals) is conveyed, by the Shadow interface 28, to the MCR 30 where it is compared with that written to memory 20 by the Master processor unit 12. Should the MCR 30 detect a mis-match between any of the data, address, or control signals of the Master and Shadow processor units 12, 14, it will assert an error (ERR) signal.

Included in the ICR 24 and MCR 30 are status registers 24a and 30a, respectively. The status registers 24a, 30a are used to record information concerning a divergence detected by the ICR 24 or MCR 30, or errors detected by the Shadow processor unit 14 or Shadow interface 28 (as reported by the DET_ERR or DET_ERR' signals).

Also included in the ICR 24 is a "deadperson" timer 24b (sometimes also referred to as a "watchdog"). Software running on the Master processor unit 12 will periodically reset the timer 24b with a predetermined value as an indication of the continued good health of the logical processor 10 and the processor units 12, 14 that form it. (Of course, the Shadow processor 14 will also attempt to reset the counter 24b, but only the Master processor unit 12 will be allowed to do so. The address, data, and control signals produced for the writes performed by the Master and Shadow processor units will, of course, be compared.) The timer 24b will then be allowed to count down toward zero or some other value until reset again with the predetermined value, or until it times out. (Alternatively, the counter could be reset and allowed to count up toward some value.) Should the counter time out before reset again, it will generate a hard reset of the logical processor 10. The value used to create the time period between reset and time-out should be long enough to account for any delays that may be encountered in connection with handling interrupts resulting from a detected divergence between operation of the Master and Shadow processor units 12, 14.

Generally, operation of logical processor 10 has the Master and Shadow processor units 12, 14 operating in close synchrony to execute identical instruction streams, instruction by instruction—as indicated above. Preferably, the two processor units 12, 14 are not tightly locked, but operate within one or two processor clock cycles apart. This, as those skilled in this art will readily recognize, will require appropriate buffering in order to synchronize checking of the data, address, and control signals produced by the Master and Shadow processor units.

Memory accesses are made by the Master processor unit 12. And, as previously indicated, only the Master processor unit 12 is allowed to write data to the memory 20. At the same time, the data written by the Master processor unit 12 is compared to that produced by the Shadow processor unit 14 by the MCR 30. Data read from the memory 20 by the Master processor unit 12 is communicated, via the MCR 30 (and Shadow interface 28), and presented to the Shadow processor unit 14 in response to its (identical) memory accesses. All memory references by the Master and Shadow processor units have the respective address, data (if a write) and control signals compared to one another by the MCR 30. If a mis-match is detected, the MCR 30 issues an ERR signal that is coupled to the I/O bridge 22 and the ICR 24. In response to the ERR signal the I/O bridge 22 will terminate transmissions onto the I/O links 23—at least temporarily.

Also in response to the ERR signal from the MCR 30, the I/O bridge 22 will write to an address space of the Master processor unit 12, informing the Master processor unit via an interrupt that a divergence has occurred so that it can proceed as described more fully below. (Alternatively, if the Master and Shadow processor units 12, 14 are of a type requiring interrupts by separate interrupt lines, there would be separate interrupt lines from the I/O bridge 22 to the Master and Shadow processor units 12, 14 to carry, inter alia, the appropriate interrupt signal(s) to notify the Master processor unit 12 of divergence detected by the ICR 24 or MCR 30.)

If it is the ICR 24 that detects a mis-match, it also will assert the ERR signal to temporarily terminate outgoing transmissions, and to cause the I/O bridge 22 to notify the Master processor unit 12 of the divergence.

According to the present invention, errors during processing will be detected by the MCR 30 and/or ICR 24, since such errors typically would be reflected by differences in output (e.g., address signals, data signals, control signals) of the Master and Shadow processor units 12, 14. Many of those errors, however, are the type of errors (e.g., soft cache errors) that can be overcome by a quick reinitialization process. Such errors can be experienced through one of four scenarios, all of which will cause the Master processor unit 12 to take control and cause a reset and subsequent reinitialization of both processor units 12, 14.

Figure 2A:
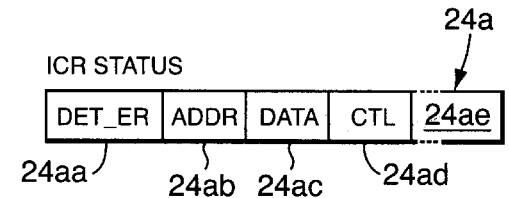
FIGS. 2A and 2B respectively illustrate the content of status registers of the I/O checker/reflector and memory checker/reflector shown in FIG. 1.
Figure 2B:
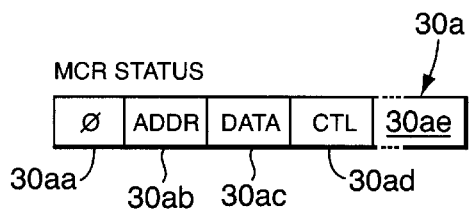

Before continuing with a discussion of those scenarios, it will be beneficial to discuss first the information available to the Master processor unit 12 when informed of a divergence. This information resides in the status registers 24a and 30a contained in the ICR 24 and MCR 30, respectively (in addition to whatever information is available to the Master processor unit 12 should it be the one to encounter an error detected by such errors as parity errors, ECC-detected errors and the like). FIGS. 2A and 2B generally illustrate the content of the status registers 24a and 30a, insofar as is relevant here.

As can be seen in FIG. 2A, the status register 24a of the ICR 24 includes four 1-bit fields, 24aa, 24ab, ..., 24ad, that provide indications as to what caused the divergence detected by the ICR 24. The remaining fields 24ae of the status register content provide other information, not relevant to this invention, such as results of ICR self-checking. Thus, if the Master and Shadow processor units write output I/O data to the I/O bridge 22 for transmission from the logical processor 10 via the I/O links 23, the ICR will check that from the Master I/O bus 26 (from the Master processor unit) against that on the Shadow I/O bus 27. If, for example, the ICR 24 sees a mis-match between the control signals on the Master I/O and Shadow I/O busses 26, 27, the 1-bit field 24ad will be set. If the mis-match is seen between address or data signals produced, the 1-bit fields 24ab and/or 24ac will be set.

The content of the ICR status register 24a further includes a 1-bit field 24aa that is set if a DET_ERR (or DET_ERR') error signal is asserted by the Shadow processor unit or interface 12, 28 as reported by the OR gate 34. Although the Master processor unit 12 may have structure to assert a DET_ERR signal, in the same manner, and for the same reasons, as the Shadow processor unit 14, it is not needed, and therefore there is no 1-bit field for this occurrence. The reason is that since the Master processor unit will know that an error has been detected by its self-checking structure, there is no need to inform it again by a 1-bit field in the ICR 24.

The content of the MCR status register 30a is similar, including as it does 1-bit fields 30ab, 30ac, and 30ad for identifying mis-matches between address, data, and/or control signals, respectively, seen by the MCR 30 on memory accesses.

Digressing for the moment, it will be apparent to those skilled in this art that there are alternatives to using the DET_ERR signal. For example, the Shadow processor 14 and associated devices (e.g., the Shadow interface 28 can be structured to be scanned and be equipped with what is called "JTAG" circuitry. (JTAG stands for the Joint Test Action Group, a collaborative organization comprised of major semiconductor users in Europe and North America who promulgated IEEE Standard 1149.1 describing the JTAG architecture and its use.) Of course, other scan architectures can be use, such as on-line access port (OLAP—also described in IEEE Standard 1149.1) or any other scan architecture. When the Master processor unit 12 is notified of a divergence, it can scan the Shadow devices for the necessary data.

Still another alternative is to recognize that what is really needed in the face of a divergence is a way to determine which processing unit had the fault that produced the divergence. Since there are processor elements available that support a "soft" reset (e.g., a reset that will reset the processor element to some initial state without losing critical information, such as error registers), the Master and Shadow processor units 12, 14, having such soft reset capability could by reset to bring them back into lock-stop synchronization without initializing all state. Some of the previous state (including registered information from the ICR 24 and MCR 30) can be kept as a "log" or "history" of what transpired prior to experiencing the divergence. When the Master and Shadow processors return from the soft reset, one of the first things they can do is to review this information to determine what caused the divergence (if that is not already known), and whether and how to proceed from then.

The first scenario involves the Master processor unit 12 experiencing a correctable error from, for example, a cache read operation; the Shadow processor unit 14 sees no error. The Shadow processor unit 14 will continue as if nothing had happened while the Master processor unit 12 will initiate a correction process (which may be implemented either as a hardware process or a software process). This will cause the two processor units 12, 14 to diverge, and that divergence will be reflected as a mis-compare in address, control, or data signals, or any of them, that will be detected by the MCR 30 (Or the ICR 24—if an I/O operation. Divergence could also be detected by both the ICR 24 and the MCR 30 at about the same time if one processor unit performs an I/O operation while the other does a memory operation.) The MCR 30 will write to the status register 30a with information identifying the divergence i.e., whether there was a mis-match between address signals, control signals, or data signals produced by the Master and Shadow processors. For example, if the address and control signals produced by the Master processor unit 14 differ from those produced by the Shadow processor unit, the 1-bit fields 30ab and 30ad of the MCR status register content 30a will be set to a predetermined state to signify those differences. (If the ICR 24 detected the divergence instead of or in addition to the MCR 30, its status registers 24a would similarly be set.)

Figure 3:
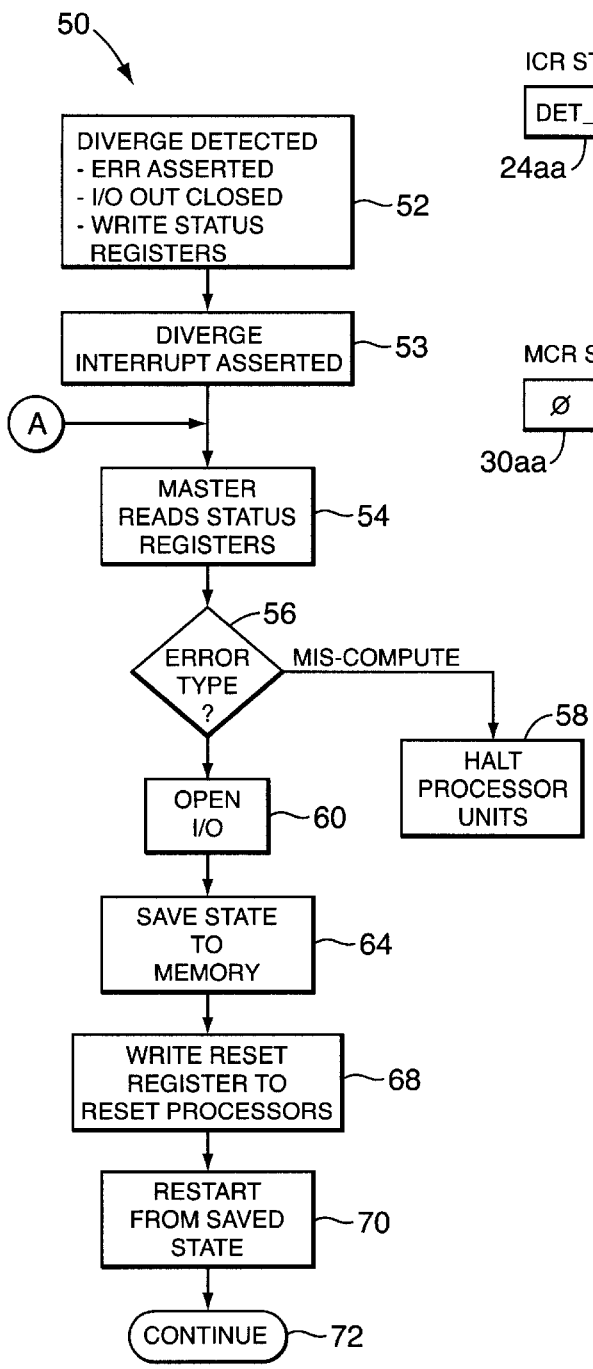
FIG. 3 is a flow diagram of the steps taken when a divergence between the two processor units of FIG. 1 is detected.

Referring now to FIG. 3, there is illustrated the procedure (50) followed when a divergence is detected. When the divergence is detected (step 52) by the MCR 30 (or ICR 24, or both—see above), it will assert the ERR signal which will immediately terminate all output from the I/O bridge 22 in order to contain any possible data corruption to the system 10. At the same time, the status register 30*a* is written with information that identifies the type of mis-match that caused the divergence as described above.

Then, at step 53, an interrupt will be asserted by the I/O bridge 22, in response to the ERR signal asserted by the MCR 30 (or ICR 24, or both), to notify the Master processor unit 12 that the divergence has occurred.

Next, at step 54, the Master processor 12 will, in response to the interrupt from the I/O bridge 22, read the status registers 24*a*, 30*a*. (The content of the status register 30*a* is coupled to the ICR 24 by an auxiliary bus 31, thereby making that content available to the Master processor unit 12 through the ICR 24.) From this status information, and its own information, the Master processor unit 12 will determine (step 56) that the divergence occurred because of the correctable error encountered by the Master processor 12, and that the Shadow processor unit 14 encountered no such error (i.e., the field 24*aa* of the ICR status register will be set to "0"—this is how the Master processor unit 12 determines that the Shadow processor unit 14 or the shadow interface 28 did not detect an error). One of the first things that the Master processor 12 will do is to open I/O transmissions (step 60). Next, the Master processor 12 will save all of its processor state (including that of the interface unit 16) to the memory 20 (step 64).

Moving then to step 68, the Master processor 12 will cause a reset of the logical processor 10 to bring the Master and Shadow processor units 12, 14 back into synchrony once again. As those skilled in this art are aware, there are a number of ways that a reset can be generated. Here, the Master processor unit will write a reset register 24*c*, contained in the ICR 24, to cause a RESET signal to be asserted. The RESET signal is applied to both the Master and Shadow processor units 12, 14, and, as is conventional, will force them to a identical, reset condition. In addition, the program counter (not shown) of the Master processor unit 12 is set to cause it to begin reading code from the boot memory 38. The Shadow processor unit 14, now having been reset back into a synchronous lock-step condition, will read the same code (reflected by the ICR 24). That code will cause the Master processor unit 12 to read the processor state earlier stored in the memory 20, which is reflected through the MCR 30 to the Shadow processor unit 14. Thus, at step 70, the Master and Shadow processors 12 and 14 are reinitialized to restart with the same processor state so that lock-step operation can commence and continue (step 72).

Digressing for the moment, suppose at step 56, the information provided the Master processor unit 12 indicates that the error was not caused by one that could ordinarily be corrected, but by a mis-computation. This will cause a divergence, but when the Master processor unit 12 reads the content of the status registers 24*a*, 30*a* (step 54; FIG. 3) it will see that neither processor detected an error. This type of error is much more serious. Accordingly, from step 56 the Master processor will halt all operation at step 58. The same action is taken if the Shadow processor unit 14 mis-computes.

Figure 4:
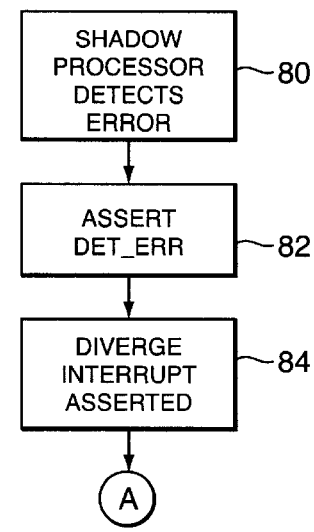
FIG. 4 is a flow diagram of the steps taken when the Shadow processor encounters a cache memory error.

The second of the four scenarios is that the Shadow processor 14 is the one that experiences a correctable error, such as a memory error (step 80; FIG. 4) and the Master processor unit 12 does not see an error. The Shadow processor unit 14 will assert the DET_ERR signal, while the Master processor 12 continues operation as if nothing had happened.

The DET_ERR signal is passed through the OR gate 34 to the ICR 24. The ICR 24 will, in turn, write the 1-bit field 24*aa* to indicate that the DET_ERR (or DET_ERR') signal was asserted. The MCR 30 (or ICR 24 or both), which will detect a divergence, will perform the actions outlined in step 52 of the procedure 50, that is, asserting an ERR signal to (temporarily) suspend outgoing I/O transmissions (and to cause the I/O bridge 22 to write a diverge interrupt to the Master processor unit 12), set the timer circuit 30*b*, and write the status register 30*a* with information identifying the mis-matches.

When the Master processor unit 12 takes the diverge interrupt, it will enter the procedure 50 at entry point A to execute step 54, i.e., it will read the status register 30*a* to determine what caused the divergence. At step 56, when the divergence has been determined to have been caused by an error detected by the Shadow processor unit 14 or Shadow interface 28 (i.e., seeing that the field 24*aa* of the ICR register 24*a* is set to a "1"), the Master processor unit 12 will treat the divergence as if it were being caused in the same manner described above: a correctable error encountered by the Master processor unit, but not seen by the Shadow processor unit. Therefore, steps 60–72 are processed in the same manner as described above.

The third scenario sees the Shadow processor unit 14 encountering an uncorrectable (but self-detected) error, and the Master processor unit seeing no error. This is basically the same situation as described above (the Shadow processor unit 14 seeing a correctable error). Thus, the Shadow processor unit will assert the DET_ERR signal to cause the diverge interrupt to be issued by the ICR 24. The procedure 50 will then be executed as described above, again under control of the Master processor 12, to reset, initialize, and restart the Master and Shadow processors 12, 14 from the processor state saved in step 64.

A fourth scenario has the Master processor unit 12 suffering an uncorrectable (but, again, self-detected) error and the Shadow processor unit does not see an error many uncorrectable errors of a processor unit are, in fact correctable by analysis and corrective action by software. Thus, the procedure 50 is used. The existence of the error will cause the MCR 30 to detect a divergence to bring the procedure 50 into play. And, as in the cases described above, the Master processor unit will determine (at step 56), after examination of status registers 24*a*, 30*a*, and its own state, whether or not a reset, re-initialization, and restart is in order. If so, the Master processor 12 will proceed to save its processor state and cause the reset, re-initialization, and reload operations to take place. If not, the Master processor 12 will proceed to step 58 and halt operation of the logical processor 10.

Figure 5:
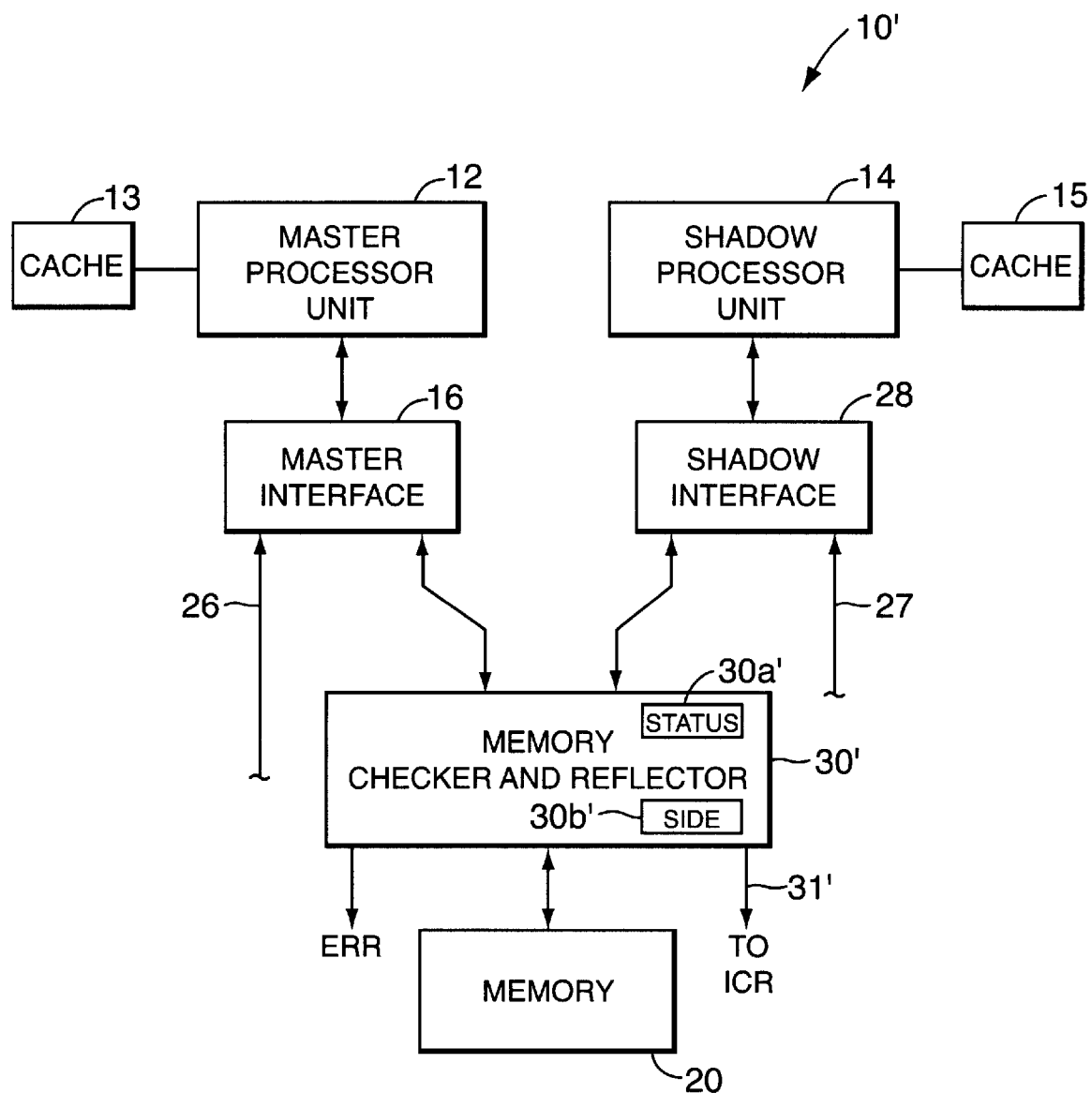
FIG. 5 is a simplified block diagram of an alternate embodiment of the invention.

Turning now to FIG. 5, an alternate embodiment of the invention is illustrated. Here only those parts of the system 10 shown in FIG. 1 necessary to understanding this alternate embodiment are shown—with their same reference numbers together with the modifications needed for the alternate embodiment. Thus, as shown in FIG. 5, the alternate embodiment, designated with the reference numeral 10', is shown as having the MCR 30 of FIG. 1 replaced by the Memory Checker and Reflector (MCR) 30' that is structured to permit read and write to the memory 20 to one or the other of the Master or Shadow processor units 12, 14.

In this alternate embodiment the Master and Shadow 12, 14 processors would operate as before: executing the same instructions in the same sequence from an identical instruction stream. Memory read operations will have the addresses produced by the Master and Shadow processor units 12, 14, together with control signals, would be routed via the corresponding interface units 26, 28 to the MCR 30' where they are checked against each other. If no mis-match is detected, the MCR 30' will access the memory 20 for the data identified on the address produced by the Master processor unit 12, and return that data to both the Master and Shadow processor units 12, 14.

If, on the other hand, a mis-match is encountered, the MCR 30' will signal that mis-match to the ICR 24 (not shown in FIG. 5) as before by the ERR signal (which also will suspend outgoing I/O transmissions from the I/O bridge of FIG. 1). The status register 30a' of the MCR 30' will be written with the appropriate information and communicated to the ICR 24 via the auxiliary bus 31'. (At the same time the ICR 24, if it also sees the mis-match, will write the status register 24a, not shown in FIG. 5). Matters will proceed as described above according to the procedure 50 shown in FIG. 3.

Write operations are substantially similar, except that the data produced by the Master processor unit 12 will also be compared to that produced by the Shadow processor unit 14.

What this alternate does that is different is to provide the capability of recovering from some of those faults detected as occurring at the Master processor unit 12 from which recovery may not be possible with the system structured as shown in FIG. 1. Certain of the errors that can be encountered that produce a mis-match, such as errors that are detected but not easily correctable by the Master processor itself, will corrupt the state of the Master processor unit 12 that will be needed in the recovery operation of the procedure 50 (FIG. 3; steps 64–70). Chances are extremely small that the same error will occur in both the Master and Shadow processor units at the same time. Thus, the state of the Shadow processor unit is most likely good.

In this instance, the Master processor unit 12 can detect such a situation, and write a "side" register 306 contained in the MCR 30' to switch which of the processor units 12, 14 will have direct access (read and write) to the memory 20. That switch will now allow the Shadow processor unit to save its state for recovery from the fault. After recovery, the Shadow processor unit 14 can continue as the Master processor unit, in which case the Master processor unit 12 performs the duties of the Shadow processor. Or, after the system 10' recovers from the error, the MCR 30' can again be switched to allow the Master processor unit 12 to continue as the master.

Any of the above-described embodiment of the invention can provide further fault tolerant operation by continuing operation in the face of a hard failure of the Shadow processor unit 14 (i.e., one from which the Shadow processor unit 14 cannot recover). If such a hard failure is encountered, the MCR 30 (or ICR 24) will detect a divergence of operation, and the reset operation described above will be run. If the Shadow processor unit 14, or its associated circuitry (i.e., the Shadow interface unit 28) again produces a mis-match, the Master processor unit 12 can correctly assume that the Shadow processor unit has a fault that cannot be corrected during run time. In this circumstance, the Master processor can disable the checking performed by the ICR 24 and MCR 30, and continue operation. Thus, the present invention allows the system to (optionally) operate albeit with a decrease in data integrity, with only the Master processor unit 12.

While a full and complete description of the present invention has been provided it should now be apparent that various modifications can be made. For example, rather than use the timer 24b (FIG. 1) that is periodically reset with a predetermined value and allowed to time-out, as described above, the timer 24b could be preset (e.g., by the ICR 24 when it asserts or sees the ERR signal) only when the Master processor unit 12 is notified that a divergence has occurred, and allowed to count (up or down) to a time-out value while the Master processor unit decides how to handle the divergence. The timer 24b would then be stopped when resolution of the divergence has been accomplished. Should the resolution process get stuck, the time-out of the timer 24b will operate as described above, causing a hard reset (and reboot) of the Master and Shadow processor units.

What is claimed is:

1. In a processing system having a Master processor unit, a Shadow processor unit, and a memory, the Master and Shadow processor units each executing an instruction stream that is identical to the other, a method for fault tolerant operation of the processing system that includes the steps of:

sending Master processor address and data signals to the memory;

sending the Master processor address and data signals to the memory checker;

after the Master processor unit has sent the Master processor address and data signals to the memory, checking the Master processor address and data signals against Shadow processor address and data signals communicated by the Shadow processor unit in order to assert a diverge signal if a mismatch is detected;

the Master processor unit checking to see if the Master processor unit or the Shadow processor unit experienced an error when the diverge signal is asserted;

halting processor operation if the Master processor determines that the error causing the mismatch is one from which recovery is not possible;

otherwise, saving processor state and data of the Master processor unit to the memory; and restoring the saved state to the Master and Shadow processor units.

2. The method of claim 1, wherein the processing system further comprises an input/output element coupled to the Master and Shadow processors, the input/output element including a transmit section for transmitting output data from the processing system, and wherein the checking step includes suspending transmissions from the transmit section if a mismatch is detected.

3. The method of claim 1, wherein the processing system includes a status register, and wherein the method further includes the step of writing information to the status register indicative of the mis-match.

4. The method of claim 3, wherein the checking step includes the step of reading the status register to determine if the Master processor unit or the Shadow processor unit experienced the error.

5. The method of claim 1, wherein the saving step includes the step of checking the error to determine if processor state of the master processor unit is corrupt, and if so alternatively saving processor state and data of the Shadow processor unit to memory.

6. The method of claim 1, further including the steps of resetting the Master and Shadow with a prior state if the restoring step does not occur within a predetermined time of detecting the mismatch.

7. The method of claim 6, including the steps of:

providing a timer;

starting the timer when a mismatch is detected; and asserting, by the timer, a time-out signal when the predetermined time has elapsed.

8. The method of claim 7, further including the steps of:

presetting the timer with the predetermined time value when a mis-match is detected; and the timer asserting a time-out signal when the predetermined time has elapsed.

9. In a processing system having a Master processor unit, a Shadow processor unit, and a memory, the Master and Shadow processor units each executing an instruction stream that is identical to the other, a method for fault tolerant operation of the processing system that includes the steps of:

sending Master processor address and data signals to the memory;

sending the Master processor address and data signals to the memory checker;

after the Master processor unit has sent the Master processor address and data signals to the memory, checking the Master processor address and data signals against Shadow processor address and data signals communicated by the Shadow processor unit in order to assert a diverge signal if a mismatch is detected;

the Master processor unit checking to see if the Master processor unit or the Shadow processor unit experienced an error when the diverge signal is asserted;

saving processor state and data of the Master processor unit to the memory if available, or alternatively, saving the processor state and data of the Shadow processor unit to the memory; and resetting the Master and Shadow processor units by restoring the saved state to the Master and Shadow processor units.

10. An article of manufacture comprising a Master processor, a Shadow processor, a memory and a checker to compare address and data signals of the Master processor to address and data signals of the Shadow processor in order to assert a diverge signal if a mismatch is detected, the memory including a computer program for causing the Master and the Shadow processor units to each execute an identical instruction stream and to cause the Master processor to tolerate faults by, determining if the Master processor or the Shadow processor experienced an error when the diverge signal is asserted;

halting operation of the Master and the Shadow processors if the error is determined to be one from which recovery is not possible;

otherwise, saving processor state and data of the Master processor to the memory; and resetting the Master and the Shadow processor units to resume operation after restoring the saved processor state and data to the Master and the Shadow processors;

wherein the checker conducts the comparison between the address and data signals of the Master processor and the address and data signals of the Shadow processor after the Master processor address and data signals have been sent to the memory.

11. A computer system, comprising:

a memory;

a Master processor unit and a Shadow processor unit for generating address and data signals and each coupled to the memory for receiving from the memory an instruction stream for execution;

a checker element coupled to receive and compare the address signals of the Master processor unit with hose of the Shadow processor unit in order to assert a diverge signal if a mis-match is detected, the checker element conducting the comparison after the Master processor address signals have been sent to the memory;

the instruction stream including a computer program for causing the Master processor unit to tolerate faults by, determining if the Master processor unit or the Shadow processor unit experienced an error when the diverge signal is asserted;

halting operation of the Master and the Shadow processor units if the error is determined to be one from which recovery is not possible;

otherwise, saving the processor state and data of the Master processor unit to the memory; and resetting the Master and the Shadow processor units to resume operation after restoring the saved processor state and data to the Master and the Shadow processor units.

12. A computer system, comprising:

a memory;

a Master and a Shadow processor units each for communicating address and data signals and for receiving from the memory an instruction stream for execution;

a checker element coupled to receive and compare the address signals of the Master processor unit with those of the Shadow processor unit to assert a diverge signal if a mismatch is detected, the checker element conducting the comparison after the Master processor address signals have been sent to the memory;

the instruction stream including a computer program for causing the Master processor unit to tolerate faults by, determining if the Master processor unit or the Shadow processor unit experienced an error when the diverge signal is asserted;

saving processor state and data of the Master processor unit to the memory if available, or alternatively, saving the processor state and data of the Shadow processor unit to the memory; and resetting the Master and the Shadow processor units to resume operation after restoring the saved processor state and data to the Master and the Shadow processor units.

13. The computer system of claim 12, further including a timer, wherein the instruction stream includes setting a timer when the mismatch is detected and resetting the Master and Shadow processor units with an initial state if the timer asserts a time-out signal a predetermined time period after the mismatch is detected if the Master and Shadow processor units have not been reset with the saved state.

* * * * *

UNITED STATES PATENT AND TRADEMARK OFFICE
CERTIFICATE OF CORRECTION

PATENT NO. : 6,393,582 B1
DATED : May 21, 2002
INVENTOR(S) : Klecka et al.

It is certified that error appears in the above-identified patent and that said Letters Patent is hereby corrected as shown below:

<u>Title page,</u>
Item [75], it reads "Inventors: James Stevens Klecka, Lexington;" it should read
-- Inventors: James Stevens Klecka, Georgetown --.

<u>Column 6,</u>
Line 14, reads "can be use, such as on-line access port (OLAP – also" it should
read -- can be used, such as on-line access port (OLAP – also --;
Line 28, reads "nization without initializing all state. Some of the previous"
it should read -- nization without initializing all states. Some of the previous --;
Line 29, reads "state (including registered information from the ICR 24 and" it should
read -- states (including registered information from the ICR 24 and --;
Line 56, reads "produced by the Master processor unit 14 differ from those" it should
read -- produced by the Master processor unit 12 differ from those --.

<u>Column 8,</u>
Line 36, reads "the Shadow processor unit does not see an error many" it should
read -- the Shadow processor unit does not see an error. Many --;
Line 67, reads "corresponding interface units 26, 28 to the MCR 30' where" it should
read -- corresponding interface units 16, 28 to the MCR 30' where --.

<u>Column 9,</u>
Line 34, reads "such a situation, and write a "side" register 306 contained in" it should
read -- such a situation, and write a "side" register 30b' contained in --.

<u>Column 11,</u>
Line 4, reads "timer asserting a time-out signal when the predeter-" it should read
-- asserting, by the timer, a time-out signal when the predeter- --;

UNITED STATES PATENT AND TRADEMARK OFFICE
CERTIFICATE OF CORRECTION

PATENT NO. : 6,393,582 B1
DATED : May 21, 2002
INVENTOR(S) : Klecka et al.

It is certified that error appears in the above-identified patent and that said Letters Patent is hereby corrected as shown below:

<u>Column 12,</u>
Line 6, reads "address signals of the Master Processor unit with hose" it should read -- address signals of the Master Processor unit with those --;
Line 29, reads "a Master and a Shadow processor units each for commu-" it should read -- a Master processor unit and a Shadow processor unit each for commu- --;
Line 32, reads "a checker element coupled to receive and compare the" it should read -- a checker element coupled to compare the --
Line 34, reads "of the Shadow processor unit to assert a diverge signal" it should read -- of the Shadow processor unit in order to assert a diverge signal --

Signed and Sealed this

First Day of April, 2003

JAMES E. ROGAN
*Director of the United States Patent and Trademark Office*